US005613584A

United States Patent [19]
Bremner et al.

[11] Patent Number: 5,613,584
[45] Date of Patent: Mar. 25, 1997

[54] TRANSMISSION CONTROL LEVER WITH RETURN TO NEUTRAL FUNCTION

[75] Inventors: Ronald D. Bremner; Bruce C. Newendorp; Patricia M. D'Alessandro, all of Cedar Falls, Iowa

[73] Assignee: Deere & Company, Moline, Ill.

[21] Appl. No.: 557,590

[22] Filed: Nov. 14, 1995

[51] Int. Cl.⁶ .............................. B60K 28/10; B60K 41/26
[52] U.S. Cl. .............................. 192/4 C; 74/475; 74/529; 180/271
[58] Field of Search ................. 192/4 C, 4 A; 180/271; 74/475, 483 R, 529

[56] References Cited

U.S. PATENT DOCUMENTS

| | | |
|---|---|---|
| 3,480,120 | 11/1969 | Lenzen et al. ............... 192/4 C X |
| 3,597,991 | 8/1971 | McCormick, Jr. et al. . |
| 3,702,648 | 11/1972 | Mori ........................... 192/4 C |
| 3,729,074 | 4/1973 | Anderson et al. ............ 192/4 C |
| 3,765,520 | 10/1973 | Asano et al. ................. 192/4 A |
| 3,811,020 | 5/1974 | Johnson et al. .............. 180/271 X |
| 4,068,540 | 1/1978 | Beckerman . |
| 4,085,833 | 4/1978 | Papasideris . |
| 4,116,313 | 9/1978 | Maucher . |
| 4,246,989 | 1/1981 | Kohler ......................... 180/271 X |
| 4,310,078 | 1/1982 | Shore .......................... 180/271 X |
| 5,181,592 | 1/1993 | Pattock . |
| 5,211,070 | 5/1993 | Hirata et al. . |

OTHER PUBLICATIONS

Literature: John Deere 5000 Series Tractors and 500 Series Loaders (undated).
Literature: Steering Controls and Foot Pedals (undated).
Literature: 310D Backhoe Loader—Product Information (undated).

*Primary Examiner*—Rodney H. Bonck

[57] ABSTRACT

A control system for controlling multi-ratio vehicle transmission includes a speed select lever movable from a park position to selected gear ratio positions and a directional control lever having forward, neutral and reverse positions. A system is provided to cause the directional control lever to automatically move to its neutral position when the shift control lever is moved to its park position.

5 Claims, 2 Drawing Sheets

TRANSMISSION CONTROL LEVER WITH RETURN TO NEUTRAL FUNCTION

BACKGROUND OF THE INVENTION

This invention relates to a vehicle transmission control system for a multiple gear ratio transmission, in particular a transmission control system having a shift or speed select lever and a forward-neutral-reverse or directional control lever.

It is known to provide vehicles with a transmission control system having a speed select or shift lever for selecting transmission gear ratios and a directional control lever with forward, neutral and reverse positions. With such a system the operator is not always required to move the directional control lever into its neutral position when park is engaged. If such an operator leaves and re-enters the vehicle, or if a new operator enters the vehicle, the lever may be moved out of park and into a selected gear position without the operator being aware of the position of the directional control lever. As a result, the vehicle may start moving in a direction not expected or not intended by the operator.

SUMMARY OF THE INVENTION

An object of the present invention is to provide a transmission control system which reduces the chances of the vehicle moving in a direction not expected or not intended by the operator.

These and other objects are achieved by the present invention wherein a control system for controlling multi-ratio vehicle transmission includes a speed select lever movable from a park position to selected gear ratio positions and a directional control lever having forward, neutral and reverse positions. A system is provided to cause the directional control lever to automatically move to its neutral position when the shift control lever is moved to its park position.

DETAILED DESCRIPTION

Figure 1:
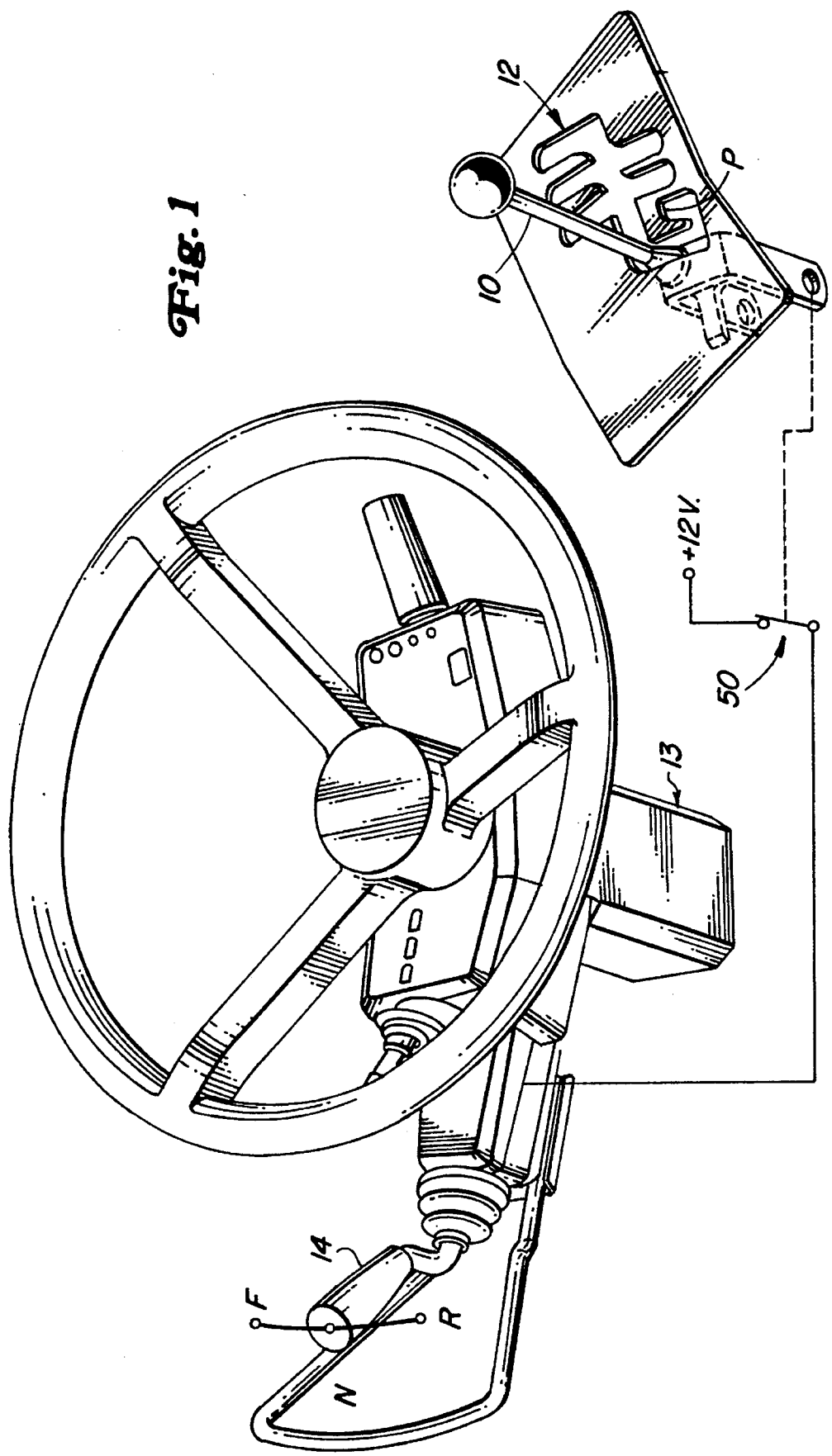
FIG. 1 is a partially schematic illustration of a lever control system according to the present invention.

As shown in FIG. 1, a shift or range lever 10 is moveable in a gate 12 to various positions, including a park position P, to control a conventional vehicle transmission (not shown), such as a John Deere Power Quad 4 speed transmission. Such a shift lever is preferably mounted in a console (not shown) in a vehicle operator compartment. A conventional directional control lever 14 is operatively coupled to the transmission (not shown) and is movable to a forward position, F, associated with a condition of the transmission (not shown) which moves the vehicle in a forward direction, a neutral position associated with a neutral condition of the transmission (not shown), and a reverse position associated with a condition of the transmission (not shown) which moves the vehicle in a reverse direction. The neutral position N is located between the forward F and reverse R positions. Such a directional control lever 14 is preferably mounted on the steering column 13 in a vehicle operator compartment.

Figure 2:
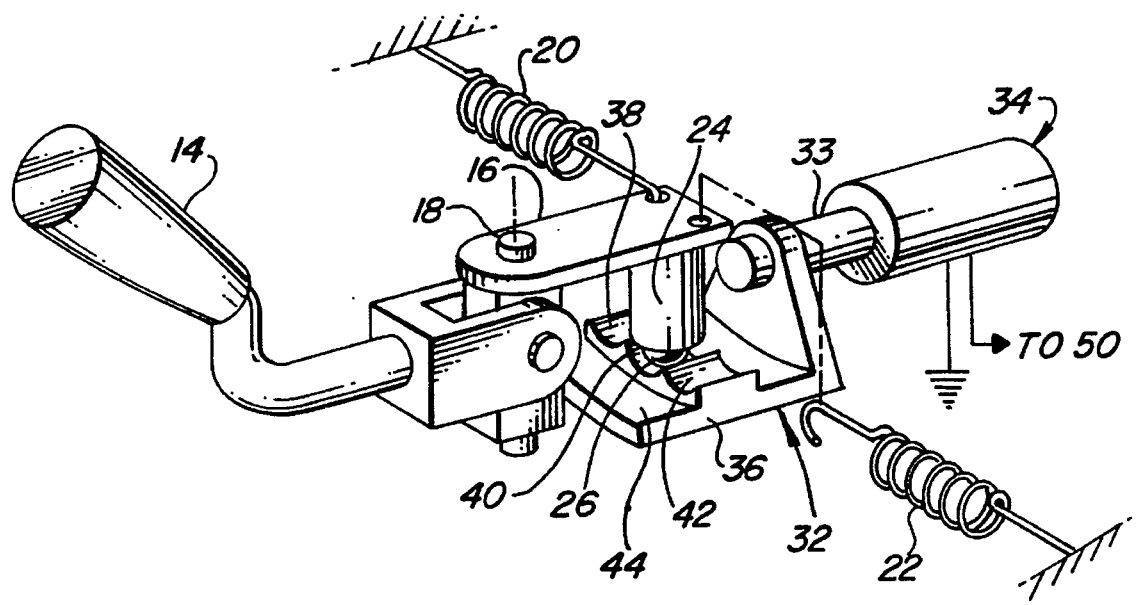
FIG. 2 is a perspective view of a forward-neutral-reverse lever mounted on a vehicle steering column.

Referring now to FIG. 2, the lever 14 is connected to a rotor arm 16 which rotates about a pin 18. A pair of centering springs 20, 22 are biased to urge the lever 14 to its neutral position. A detent sleeve 24 is mounted on the end of arm 16. A detent roller 26 is mounted in the end of sleeve 24 and is biased outwardly thereof by a detent roller spring (not shown) which is enclosed within the sleeve 24. The roller 26 is engagable with a detent slider mechanism which includes a detent slide 32 mounted on a shaft 33 of a linear actuator 34, such as a linear solenoid. The slide 32 includes a base 36 upon which are formed three curved detent grooves 38, 40 and 42 and a detent slot 44. The slide 32 has a detent position wherein detent roller 26 is engagable with the detent grooves 38–42 and a non-detent position wherein the roller 26 free to move across the slot 44. When the solenoid 34 is energized and extended, and the slide 32 will be in the detent position shown in FIG. 2. The slide 32 is preferably biased to the right, viewing FIG. 2, towards its retracted non-detent position by a spring (not shown) which is internal to the solenoid 34.

As best seen in FIG. 1, a normally closed park switch 50 is connected electrically between a 12 volt source, +12 v, such as the vehicle battery, and the solenoid 34. When the switch 50 is closed, the solenoid 34 is energized and extended, and the slide 32 will be in the detent position shown in FIG. 2. The switch 50 is operatively coupled to the shift lever 10 so that it is opened only when the shift lever 10 is moved to its park position P. As a result, when the shift lever 10 is moved to its park position, the switch 50 opens, the solenoid 34 is de-energized and the slide 32 moves to the right and moves the detent grooves 38–42 out of engagement with the detent roller 26. The centering springs 20 and 22 will then return the directional control lever 14 to its neutral position. This prevents the operator from unintentionally leaving the lever 14 in forward or reverse after the shift lever 10 is placed in park. Also, because the solenoid 34 must be energized for the slide 32 to be in its detent position, if a power failure occurs, the lever 14 will be returned to the neutral position.

While the invention has been described in conjunction with a specific embodiment, it is to be understood that many alternatives, modifications and variations will be apparent to those skilled in the art in light of the foregoing description. In this regard, the present invention could be used in connection with any set of transmission controls where the park engagement control is on a different lever than the direction control. For example, there are some tractors which have a park control lever which is separate from any other control. Other tractors use a park brake instead of a park pawl. This invention would apply to both such situations. Accordingly, this invention is intended to embrace all such alternatives, modifications and variations which fall within the spirit and scope of the appended claims.

We claim:

1. In a control system for controlling multi-ratio vehicle transmission, the control system having a first control lever having a park position associated with a condition wherein movement of the vehicle is prevented, and having a directional control lever having a forward position associated with a condition of the transmission which moves the vehicle in a forward direction, a neutral position associated with a neutral condition of the transmission, and a reverse position associated with a condition of the transmission which moves the vehicle in a reverse direction, characterized by:

a detent mechanism engagable with the directional control lever, the detent mechanism having a detent position wherein the directional control lever is held in its forward or its reverse position, and the detent mechanism having a release position wherein the directional control lever is moved to its neutral position; and means coupled to the first lever for moving the detent mechanism to its release position when the first lever is moved to its park position.

2. The invention of claim 1, wherein:

the detent mechanism comprises an electrically operated actuator which is coupled to a source of electrical power and which automatically moves to the release position when the source of power is disconnected from the actuator.

3. The invention of claim 1, wherein:

the first lever comprises a speed select lever having a plurality of gear positions associated with selected gear ratios of the transmission.

4. In a control system for controlling multi-ratio vehicle transmission, the control system having a first lever having a park position associated with a condition wherein movement of the vehicle is prevented, and having a directional control lever having a toward position associated with a condition of the transmission which moves the vehicle in a toward direction, a neutral position associated with a neutral condition of the transmission, and a reverse position associated with a condition of the transmission which moves the vehicle in a reverse direction, characterized by:

means for generating a park signal when the first lever is in its park position; and means for automatically moving the directional control lever to its neutral position in response to the park signal, said means for automatically moving comprising:

a centering spring coupled to the directional control lever and biased to urge it towards its neutral position;

a detent member engagable with the directional control lever, the detent member having a detent position wherein the directional control lever is held in its forward or its reverse position, and the detent member having a release position wherein the directional control lever is allowed to be returned to its neutral position by the centering spring;

a detent spring coupled to the detent member and biased to move the detent member to its release position;

an actuator coupled to the detent member and energizable to move the detent member to its detent position against the bias of the detent spring;

a source of energy; and a switch connected between the energy source and the actuator, the switch also being coupled to the first lever so that the switch disconnects the actuator from the energy source when the first lever is in its park position.

5. The invention of claim 4, wherein:

the first lever comprises a shift control lever having a plurality of gear positions associated with selected gear ratios of the transmission.

* * * * *

UNITED STATES PATENT AND TRADEMARK OFFICE
CERTIFICATE OF CORRECTION

PATENT NO. : 5,613,584
DATED : March 25, 1997
INVENTOR(S) : Ronald D. Bremner, et al.

It is certified that error appears in the above-identified patent and that said Letters Patent is hereby corrected as shown below:

Claim 4, Column 3, line 23, delete "toward" and insert -- forward --.

Claim 4, Column 3, line 25, delete "toward" and insert -- forward --.

Signed and Sealed this

Twenty-third Day of December, 1997

Attest:

BRUCE LEHMAN

Attesting Officer

Commissioner of Patents and Trademarks